United States Patent [19]
Ward

[11] 3,925,848
[45] Dec. 16, 1975

[54] SHRIMP DEHEADER

[76] Inventor: Hubert Ward, 1412 Choctaw Avenue, Metairie, La. 70005

[22] Filed: June 29, 1973

[21] Appl. No.: 375,151

[52] U.S. Cl. .................................... 17/71; 17/48
[51] Int. Cl.² .................................... A22C 29/00
[58] Field of Search ............... 17/71, 53, 72, 48; 241/46.08, 46.11, 243

[56] References Cited

UNITED STATES PATENTS

| | | | |
|---|---|---|---|
| 1,643,504 | 9/1927 | Lea | 17/63 |
| 2,068,450 | 1/1937 | Eberly | 241/243 |
| 2,534,767 | 12/1950 | Greiner | 17/71 X |
| 3,375,547 | 4/1968 | Reinke | 17/71 |
| 3,461,485 | 8/1969 | Crepeau | 17/63 |
| 3,665,556 | 5/1972 | Gruber | 17/71 |

FOREIGN PATENTS OR APPLICATIONS

| | | | |
|---|---|---|---|
| 659,111 | 10/1951 | United Kingdom | 241/46 |
| 1,179,303 | 1/1970 | United Kingdom | 17/71 |

Primary Examiner—Richard J. Apley
Assistant Examiner—William R. Browne

[57] ABSTRACT

A shrimp deheading machine in the form of an upstanding stationary shell in which is coaxially mounted a rotating drum defining an annular space therebetween. The stationary shell has inwardly projecting pins and the rotary drum has outwardly projecting pins. A belt conveyor delivers shrimp to the top of the rotary drum, and a water spray nozzle is there provided to facilitate the outward movement of the shrimp by centrifugal force so that they may drop into said annular space. As the shrimp fall between the stationary and rotating pins, the relatively softer head portions thereof are detached from the tail portions. A conveyor is provided beneath the coaxial upstanding shell and drum to carry away the separated shrimp heads and tails.

10 Claims, 5 Drawing Figures

SHRIMP DEHEADER

This invention relates to apparatus for processing shrimp and similar seafood, and more particularly to a machine for separating the heads from the edible body portions of shrimp in preparing the shrimp for the commercial market.

The main object of the invention is to provide a novel and improved shrimp deheading machine which is relatively simple in construction, which is efficient in operation, which has a high capacity, and which can operate continuously with a minimum amount of human supervision.

A further object of the invention is to provide an improved shrimp deheading apparatus which is inexpensive to manufacture, which is relatively compact in size, which can be easily cleaned, and which involves relatively few parts.

A still further object of the invention is to provide an improved shrimp deheading apparatus in which shrimp can be deheaded without the necessity of physically handling them and without the use of human labor, wherein shrimp can be rapidly and economically deheaded, and wherein minimum damage is caused to the edible body portions of the shrimp.

A still further object of the invention is to provide an improved shrimp deheading apparatus which removes the head portions from the tail portions of the shrimp by subjecting the shrimp to the cooperating action of stationary and rotating pin elements, causing the head portions of the shrimp to break away from the edible tail portions thereof, and accomplishing this action in a rapid and efficient manner requiring a minimum amount of human labor.

Further objects and advantages of the invention will become apparent from the following description and claims, and from the accompanying drawings wherein:

Figure 1:
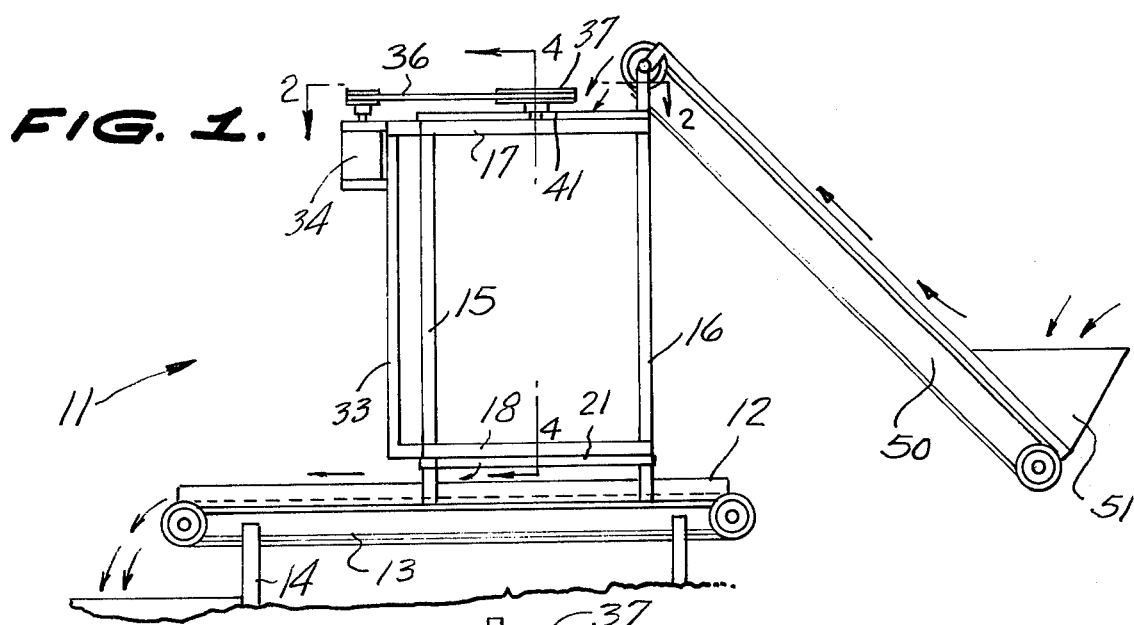
FIG. 1 is a front elevational view of an improved shrimp deheading machine constructed in accordance with the present invention.
Figure 4:
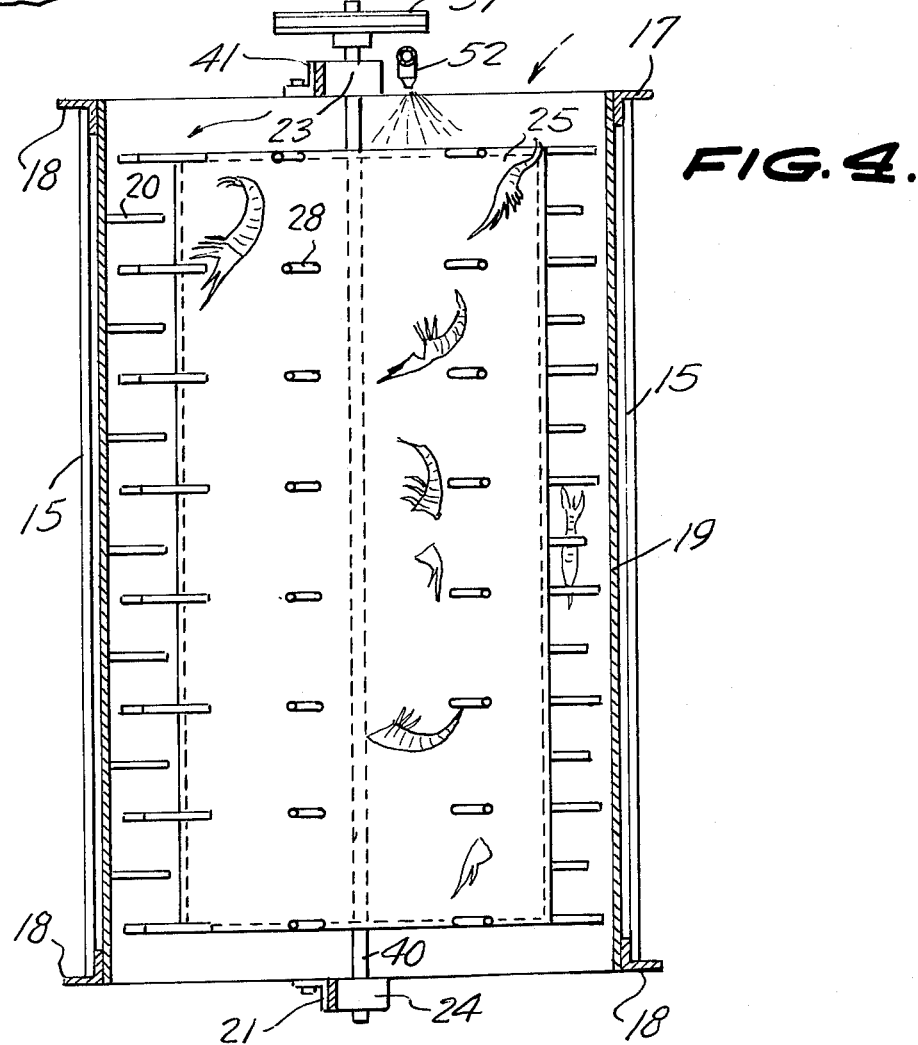
FIG. 4 is a transverse vertical cross-sectional view taken substantially on line 4—4 of FIG. 2.
Figure 2:
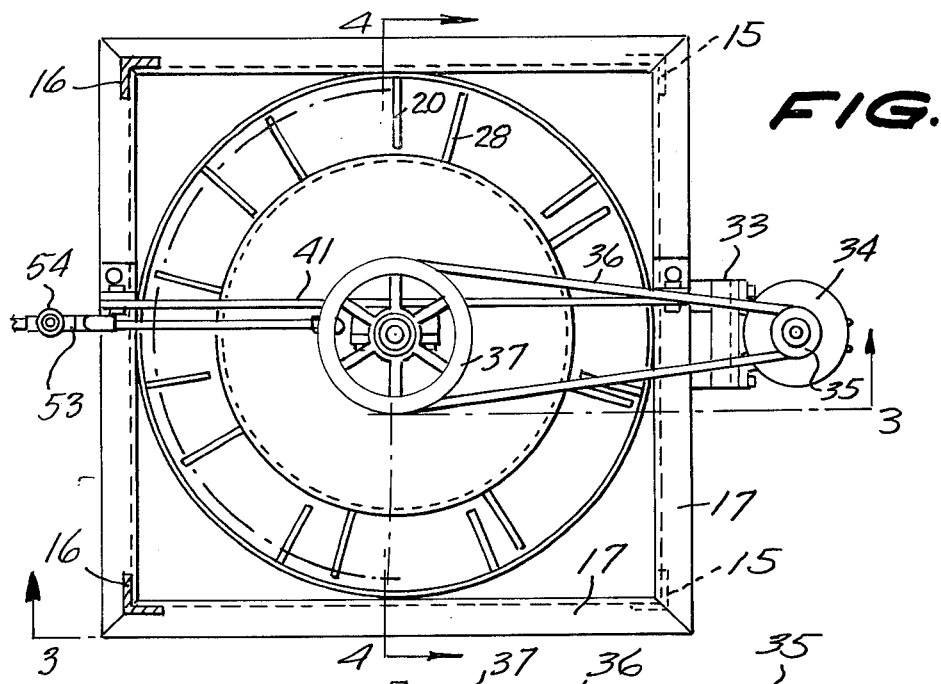
FIG. 2 is an enlarged horizontal cross-sectional view taken substantially on line 2—2 of FIG. 1, omitting the input conveyor belt.
Figure 3:
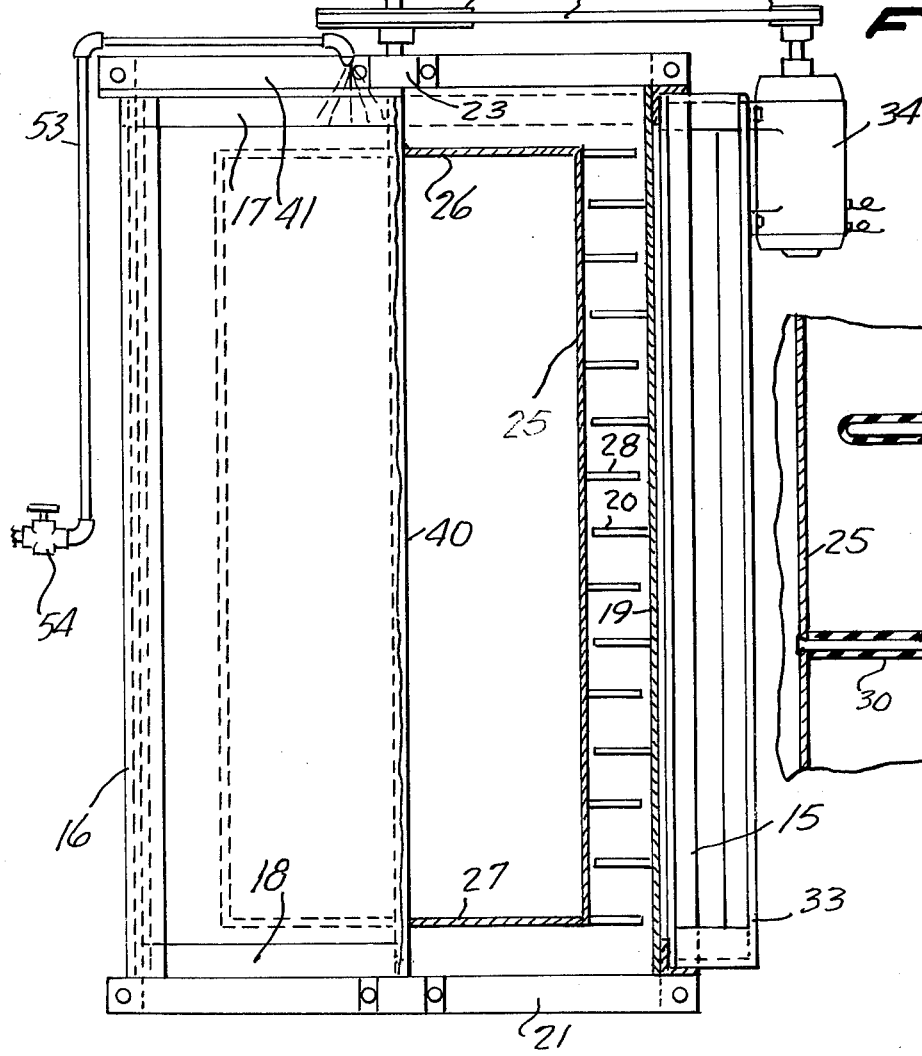
FIG. 3 is a vertical cross-sectional view taken substantially on line 3—3 of FIG. 2.

It is well known to those familiar with the preparation of seafood articles for market that it is desirable to remove the heads from shrimp before preparing them or packing them for the commercial market. Thus, to facilitate storage of the shrimp and for other purposes, their heads must be removed in order to eliminate the mushy organs and fat that lodges in the rear portions of the heads.

Shrimp which are frozen headless remain in perfect condition for over a year, whereas shrimp that are frozen with their heads attached become discolored in a short time and are unfit for the market.

In processing shrimp for the commercial market, it has been heretofore customary to use human labor to remove the heads from the shrimp, and in view of the fact that a large quantity of shrimp moves through the market, an enormous amount of human labor is ordinarily involved in deheading the shrimp, The structure of the shrimp basically consists of two parts, the head and the tail. The head which is relatively rigid, comprises about 40 percent of the length of the shrimp, the edible portion, namely, the tail comprising substantially the remainder of the length of the shrimp. The weakest part of the structure of the shrimp is at the region where the head and tail meet, and the head of the shrimp can be readily broken away from the tail portion if the shrimp if forced to bend sufficiently at this weak point.

A prime purpose of the present invention is to provide an apparatus wherein the shrimp move between cooperating pin elements or fingers which act on the shrimp to bend them, as above described, and which cause the head and tail to separate at the connection therebetween.

Referring to the drawings, 11 generally designates an improved shrimp deheading apparatus constructed in accordance with the present invention. The apparatus 11 comprises a frame structure having a generally horizontally extending bottom portion 12 which may comprise a framework including a horizontally extending belt conveyor 13 having supporting legs 14. Mounted above the belt conveyor 13 is an auxiliary upstanding framework comprising pairs of vertical corner angle bars 15, 15 and 16, 16 defining the aforesaid enclosure. The corner angle bars 15, 15 and 16, 16 are connected at their top portions by horizontal angle bars 17 and at their lower portions by horizontal angle bars 18, defining the upstanding frame enclosure. Rigidly secured within the frame enclosure thus described is an upstanding vertical cylindrical shell member 19 whose interior surface is provided with a plurality of inwardly projecting pin elements 20 which are arranged in evenly spaced horizontal planes over substantially the entire vertical height of the shell member 19.

Top and bottom cross bars 41 and 21 are provided on the top and bottom panels of the upstanding framework containing shell member 19, and journalled to the intermediate portions of the bars 41 and 21 is a vertical shaft 40 coaxial with shell member 19. Thus, respective bearing assemblies 23 and 24 are secured to the intermediate portions of the top and bottom cross bars 41 and 21, said bearing assemblies being of the conventional type providing vertical support as well as rotary support of the shaft 40. A rigid drum member 25 is secured to the shaft member 40 and is thus supported within the shell member 19 coaxially with respect to said shell member. Drum member 25 has a circular top wall 26 and a circular bottom wall 27. Said drum member 25 is supported so that it can rotate within the shell member 19, and its outside diameter is such as to provide an annular clearance space around the drum member of the order of 4 inches in width in a typical embodiment of the invention. In said typical embodiment, the top walls 26 is spaced below the top plane of the shell member 19 approximately 3 inches, and similarly, the bottom wall 27 is spaced above the bottom plane of shell member 19 by a similar distance of approximately 3 inches. Drum member 25 is provided with a plurality of outwardly projecting pin elements 28 similar to the pin elements 20 but located in horizontal planes spaced midway between the horizontal planes of pins 20. The pin elements 20 and 28 are of sufficient length to extend across the annular clearance space between drum element 25 and shell member 19, the pin elements 20 terminating adjacent the surface of drum element 25 and the pin elements 28 terminating adjacent the inside cylindrical wall surface of shell member 19.

In a typical embodiment of the invention, the outer shell member 19 was approximately 28 inches in diameter and 4 feet high and the drum member 25 was approximately 20 inches in diameter and 3½ feet high. The shell member 19 was provided with seven circular rows of pin elements 20, there being eight pin elements in each row, the uppermost row being spaced 6 inches below the top plane of the shell member and the lowermost row of pin elements 20 being spaced 6 inches from the bottom plane of the shell member. The drum member 25 was provided with eight circular rows of outwardly projecting pin elements 28, the uppermost circular row of pin elements 28 being located substantially at the top rim of the drum member 25 and the lowermost row being located substantially at the bottom rim of said drum member. Each circular row of pin elements 28 consisted of eight pin elements evenly spaced around the periphery of the drum member. The drum member 25, which was about 42 inches long, was coaxially located inside the shell member 19, with top wall 26 being spaced 3 inches below the plane of the top rim of shell member 19 and the bottom wall 27 of the drum member spaced 3 inches above the plane of the bottom rim of the shell member 19, as above mentioned. This design provides a 3 inch spacing between the horizontal planes of the circular rows of pin elements 20 and 28. The pin elements 20 and 28 were about 3½ inches in length, providing a ½ inch clearance between pin elements 20 and the peripheral surface of drum member 25 and between pin elements 28 and the interior surface of shell member 19.

Figure 5:
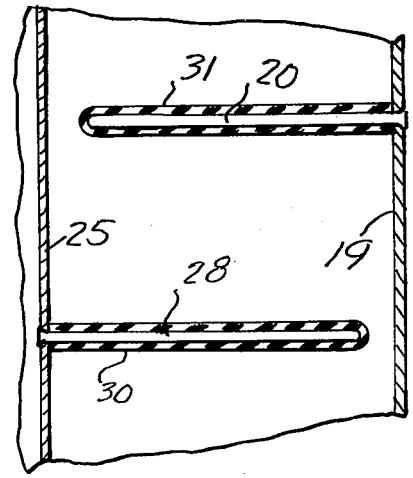
FIG. 5 is an enlarged fragmentary vertical cross-sectional view taken through opposing portions of the vertical shell member and the vertical drum member with their pin elements in vertical alignment and showing the resilient deformable outer linings provided on the pin elements.

As shown in FIG. 5, the pin elements 28 are provided with a resilient deformable rubber lining 30 and the pin elements 20 are similarly provided with a resilient deformable rubber lining 31, to minimize damage to the shrimp passing downwardly through the space between drum member 25 and shell member 19 and engaged by the pin elements, as will be presently described.

As above-mentioned, the horizontal planes of the pin elements 28 are spaced apart by equal vertical amounts, and the horizontal planes of the pin elements 20 are likewise spaced apart by equal vertical amounts. In the typical embodiment above-described, the horizontal planes of the pin elements 20 were spaced 6 inches apart and the horizontal planes of the pin elements 28 were likewise spaced 6 inches apart, thereby providing a 3 inch spacing between the horizontal planes of the pin elements 28 and the pin elements 20.

Rigidly secured to the framework containing the stationary shell member 19 is a vertical framework 33 to the top end of which is vertically secured an electric motor 34. Secured on the shaft of the motor 34 is a small pulley 35 which is drivingly connected by the belt 36 to a relatively large pulley 37 secured to the top end portion of the vertical drum shaft 40. The motor 34 and the speed reduction arrangement defined by small pulley 35, belt 36 and large pulley 37 is such as to preferably provide a speed of rotation of drum member 25 of between 125 and 300 revolutions per minute.

An input conveyor belt assembly 50 is provided leading to the upper space in shell member 19 around the top wall 26 of drum member 25. Thus, the conveyor assembly 50 is preferably inclined and is connected at its top end to the top end portions of the upstanding frame bars 16, as diagrammatically shown in FIG. 1. The belt conveyor assembly 50 is provided at its lower end with a hopper 51 adapted to receive shrimp to be deheaded.

Mounted in a suitable manner above the central portion of the rotary drum member top wall 26 is a downwardly directed spray nozzle 52 which is connected by suitable piping 53 including a control valve 54 to a suitable source of water. With valve 54 opened, a jet of water is provided which is directed downwardly onto the intermediate portion of top wall 26. As will be presently explained, the downwardly directed water jet facilitates the outward sliding movement of shrimp deposited on the rotating top wall 26, allowing the shrimp to be moved by centrifugal force toward the annular space between drum member 25 and shell member 19.

In operation, the shrimp to be deheaded are placed in the hopper 51 and are elevated by the belt conveyor 50 from which they are discharged onto the rotating top wall 26 of drum member 25. The above-explained water jet action impinging on the shrimp moistens them and allows them to slide outwardly by centrifugal force to the peripheral edge of top wall 26 and thence causes them to drop downwardly into the space defined between the drum member 25 and the stationary shell 19. The shrimp drop downwardly through this space, being engaged by the rotating pin elements 28, being moved by said pin elements against the stationary pin elements 20 and being thereby caused to bend so as to detach the shrimp heads from the shrimp tail portions. A sufficient number of engagements are provided as the shrimp descend downwardly through the annular space to insure that the heads will be detached from the tails of the shrimp when they finally reach the bottom end of said annular space. The separated shrimp heads and tail portions drop onto the conveyor belt 13 and are moved horizontally thereon to be eventually discharged at the left end of the belt conveyor assembly 13, as viewed in FIG. 1, onto a suitable sorting surface or conveyor associated with a station where the heads and tails can be separated by other suitable means.

In a typical embodiment of the machine above-described, there is provided only a 4 inch clearance all around the drum 25 between said drum and the stationary shell member 19, so that it is practically impossible for shrimp to fall through this clearance space without being struck a sufficient number of times by the rotating pin elements 28 to detach the shrimp head, inasmuch as the shrimp head is much softer than the shrimp tail portion. The spray jet nozzle 52 provides a sufficient amount of water continuously on the rotating drum member 55 to provide a uniform washing action on the drum member to facilitate smooth passage of the shrimp through the apparatus.

While a specific embodiment of an improved shrimp deheading apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A shrimp deheading apparatus comprising an upstanding stationary cylindrical shell member having an axis which is disposed closer to the vertical than to the horizontal, a rotary drum member substantially coaxially mounted in said shell member, means to rotate said drum member with respect to said stationary shell member, said drum member having a circular top wall for receiving shrimp to be deheaded which is slightly less in diameter than the said shell member so as to define an annular space between the drum member and the shell member of just sufficient radial width to receive shrimp lengthwise from said drum top wall, a plurality of inwardly extending pin elements on the interior surface of said shell member terminating closely adjacent the peripheral surface of the drum member, a plurality of outwardly extending pin elements on the drum member extending toward and terminating closely adjacent the interior surface of the shell member, the pin elements on said shell member being of different elevations than the pin elements on the drum member, and means for spraying water downwardly onto the central portion of the top wall of said drum member to facilitate outward sliding movement of shrimp and assist centrifugal force in moving shrimp toward said annular space, whereby shrimp deposited on said top wall of the rotary drum member are fed by centrifugal force to said annular space in which the shrimp drop by gravity and are engaged by the pin elements to dehead the shrimp.

2. A shrimp deheading apparatus according to claim 1, wherein said annular space has a radial width of approximately 4 inches.

3. The shrimp deheading apparatus of claim 1, and wherein the means to spray water comprises a downwardly directed conduit element and a spray nozzle located above the center portion of said top wall.

4. The shrimp deheading apparatus of claim 1, and wherein said pin elements are provided with resilient deformable outer linings to minimize damage to the shrimp.

5. The shrimp deheading apparatus of claim 4, and wherein said stationary shell member is provided with an upstanding supporting frame and said drum member is journalled in said supporting frame.

6. The shrimp deheading apparatus of claim 5, and wherein means is provided to deliver shrimp onto said top wall comprising a belt conveyor terminating over the top wall and provided at its outer end with a receiving hopper.

7. The shrimp deheading apparatus of claim 6, and an outwardly extending belt conveyor mounted on said supporting frame and spaced below said shell member and drum member to receive deheaded shrimp from said annular space.

8. The shrimp deheading apparatus of claim 7, and wherein the pin elements of the drum member are located in planes spaced substantially midway between the planes of the pin elements of the shell member.

9. The shrimp deheading apparatus of claim 8, and wherein the means to rotate the drum member comprises an electric motor mounted on said supporting frame and drivingly coupled to said drum member.

10. The shrimp deheading apparatus of claim 9, and wherein the shell member and drum member are vertically mounted and have a common vertical axis.

* * * * *